United States Patent

[11] 3,543,675

| [72] | Inventor | Barry R. Angarola<br>Franklin Park, Illinois |
|---|---|---|
| [21] | Appl No | 790,574 |
| [22] | Filed | Jan. 13, 1969 |
| [45] | Patented | Dec. 1, 1970 |
| [73] | Assignee | Signode Corporation<br>a corporation of Delaware |

[54] STRAPPING APPARATUS
26 Claims, 8 Drawing Figs.

[52] U.S. Cl. .................................................. 100/17,
100/4, 100/19, 100/23
[51] Int. Cl. ...................................................... B65b 13/24
[50] Field of Search............................................ 100/8, 4,
17, 18, 19, 20, 23, 29, 30, 32, 33

[56] References Cited
UNITED STATES PATENTS
| 1,889,372 | 11/1932 | Nolan............................ | 100/11 |
| 3,104,606 | 9/1963 | Kerrigan........................ | 100/17X |
| 3,245,634 | 4/1966 | Schooler....................... | 100/17UX |

Primary Examiner—Billy J. Wilhite
Attorney—Dressler, Goldsmith, Clement and Gordon ABSTRACT: Apparatus for applying strap around a bale or like bundle including: means for moving bales horizontally into and out of a sealing station, adjacent bales cooperating to clamp a length of strap or like binding material therebetween so that strap is pulled around three sides of a bale as it moves into the sealing station; a needle assembly for moving a length of strap around the fourth side of the bale; a gripper assembly for pulling the last mentioned length of strap toward a sealing head; and means for applying a seal to overlapping strap portions at the sealing station. Movement of the gripper assembly toward the needle assembly actuates blocking means for preventing actuation of the sealing structure, a fork structure movable under the strap for lifting the strap away from the bale into sealing position, a cutoff mechanism for severing the strap from the strap supply, and a feed system for feeding a length of strap for the next bale to be strapped.

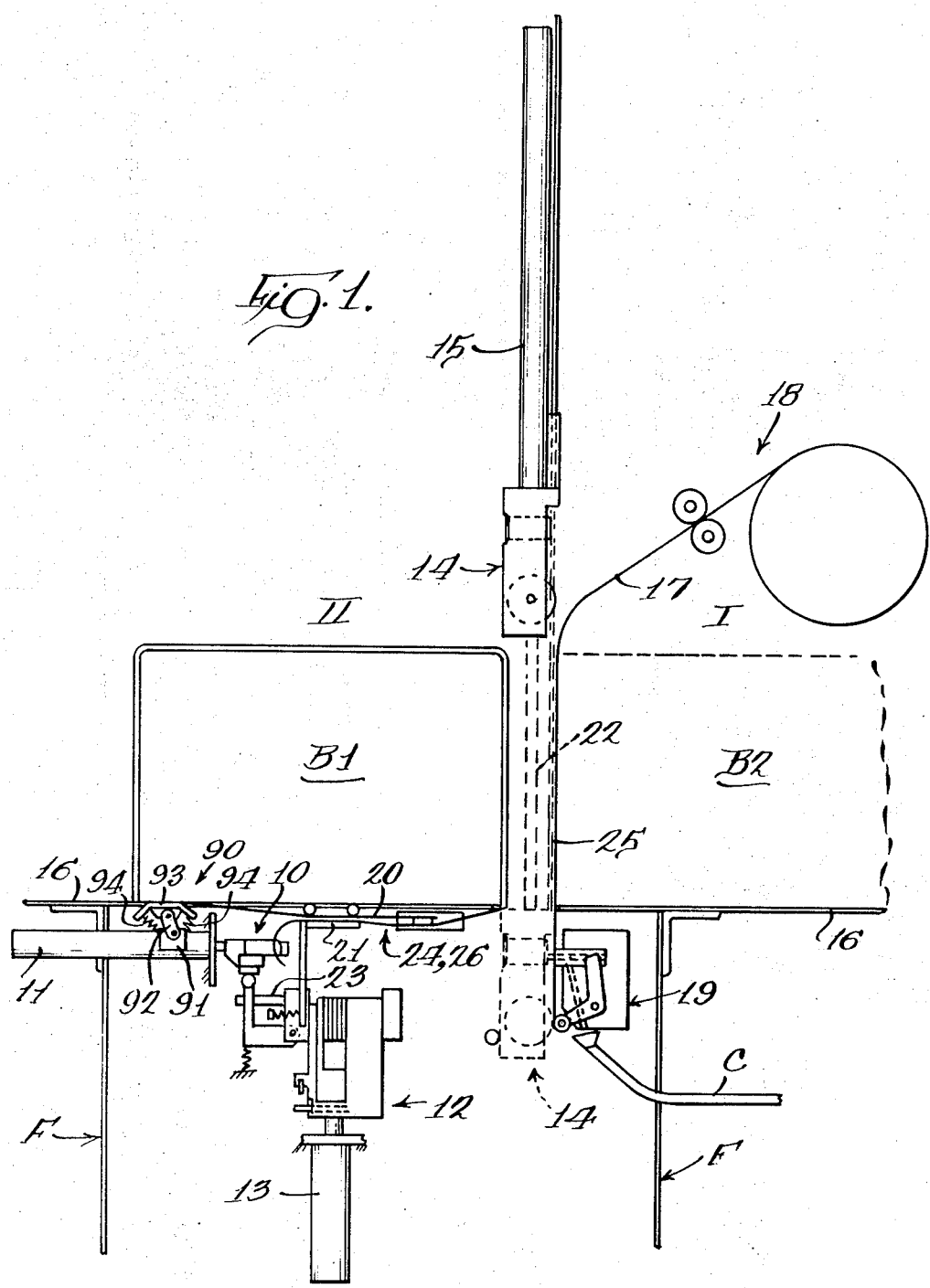

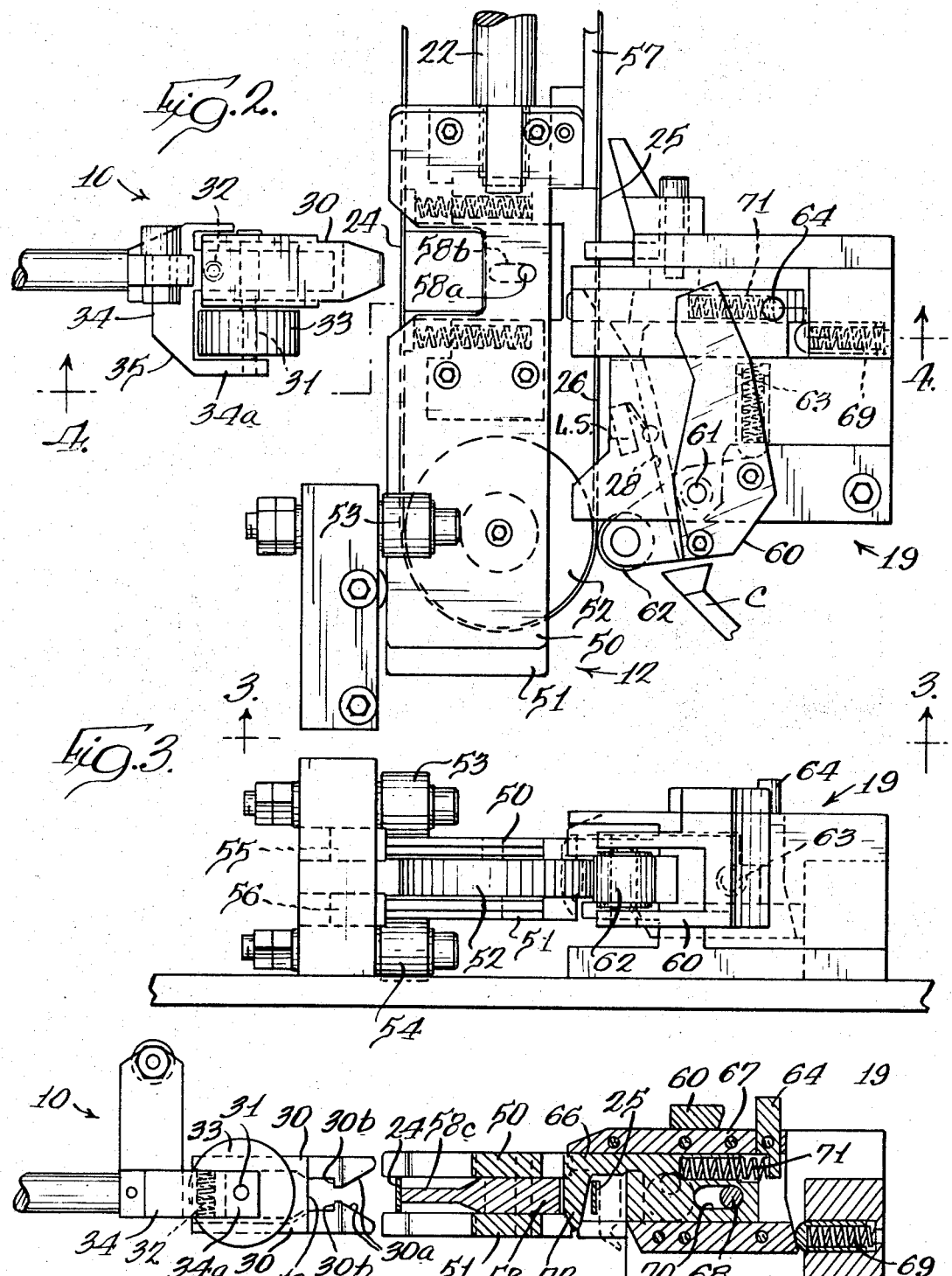

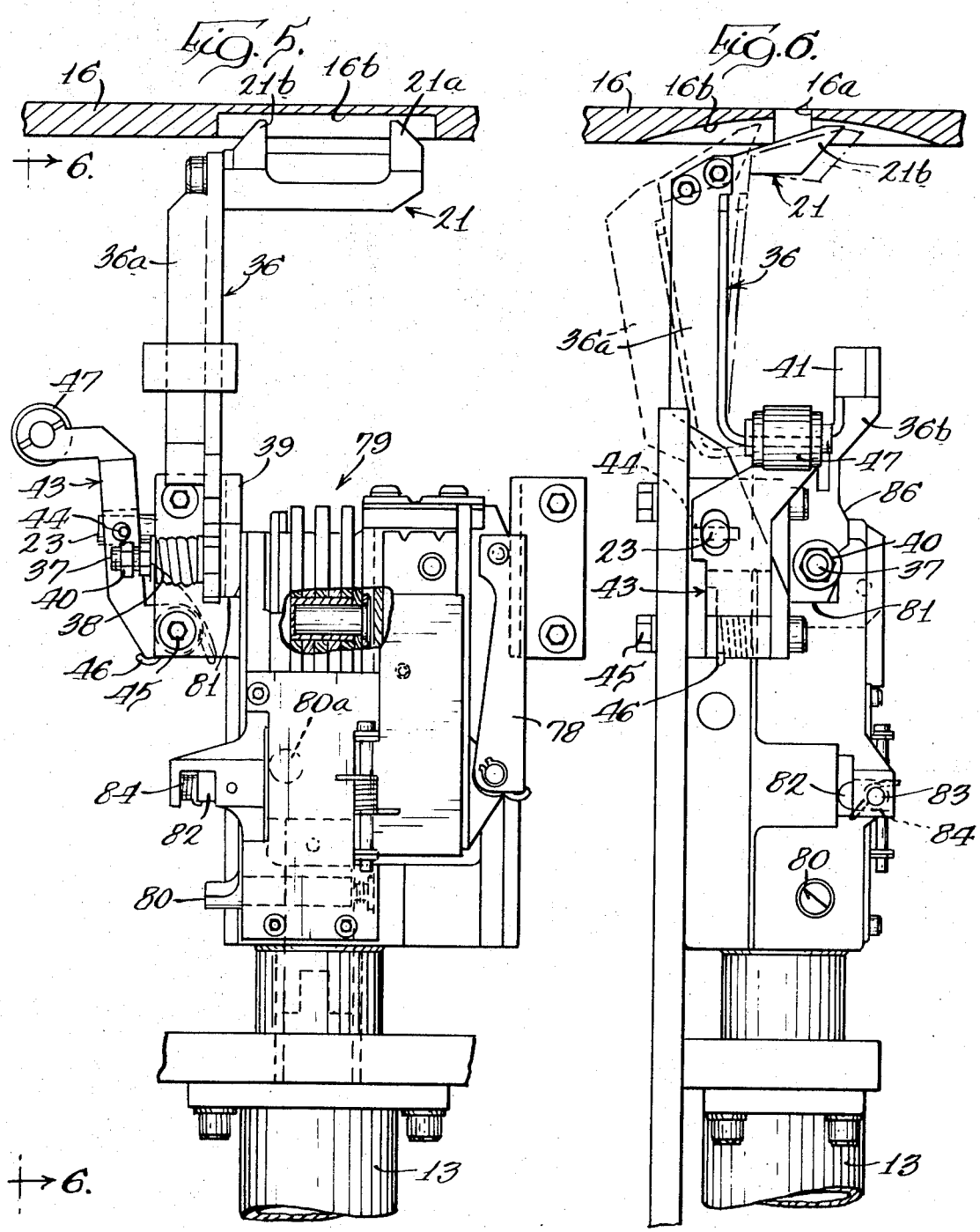

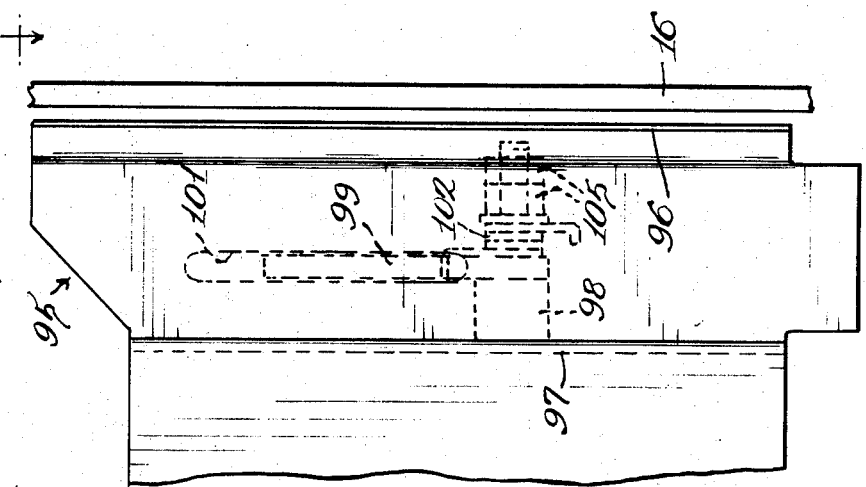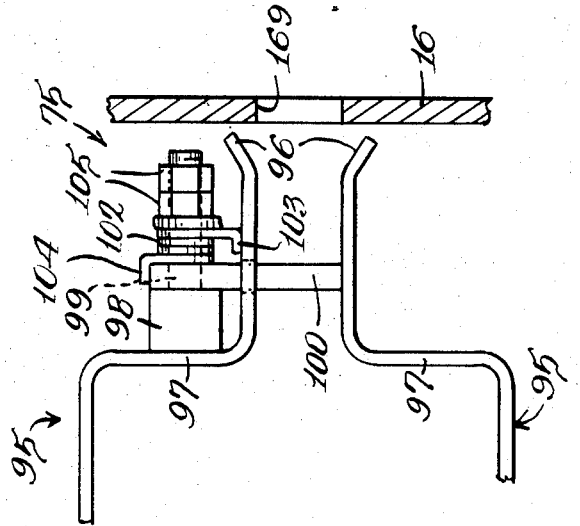

STRAPPING APPARATUS

BACKGROUND OF THE INVENTION

In the past, may types of equipment have been used to form cotton bales and the like. In one known type of apparatus, the baled material is compressed by a horizontally moving ram structure, and the compressed bale is moved by the ram structure to a strapping station where one or more bands are secured in encircling relationship around the bale. These devices have, in general, functioned satisfactorily; however, certain operational deficiencies have been present. For example, in certain arrangements, difficulty has been encountered in guiding the strapping to reliably provide a complete loop of strapping about a bale. Also, strap cutting devices that have been used in the past to sever the strap from the strap supply have not been positive in action, and properly coordinated with the other elements of the apparatus. Additionally, no satisfactory means has heretofore been provided for lifting the overlapping strap portions at the sealing station away from the bale for application of a seal to secure the strap portions together. Furthermore, in known arrangements, it has been possible to actuate the strap sealing mechanism at inappropriate times during the compressing and encircling of a bale, and this has often resulted in improperly strapped bales and damaged equipment.

SUMMARY OF THE INVENTION

The present invention obviates problems encountered with prior art arrangements by providing a simple, yet extremely reliable and positive strap positioning means in the form of a pivoted fork structure that swings under the strap to lift the strap into proper position for the sealing operation. The fork may be actuated in response to movement of a sealing head, but in the specific embodiment illustrated herein, the fork is moved into an active strap positioning location in response to movement of a gripper assembly away from a rest position. This latter movement is also utilized to actuate a safety lock which prevents actuation of the sealer mechanism until the gripper assembly returns to the rest position. In the specific embodiment illustrated herein, the fork structure is returned to a rest position in response to movement of the sealing head toward a seal impressing position. The present invention also provides a novel cutoff mechanism that is actuated by the gripper assembly as it moves into cooperative relationship with a strap feeding needle assembly.

Although the various features of the invention have general utility in many different strapping environments, the invention has particular utility in bale strapping apparatus wherein strapping is positioned around three sides of a bale by virtue of the clamping engagement of a length of strap between adjacent bales, and subsequent horizontal movement of the bale to be strapped to a sealing station. The above mentioned needle assembly positions a length of strap around a fourth side of the bale, and the movement of the gripper assembly is related to the needle assembly, such that the gripper assembly can pick up the strap length prior to actuation of the cutoff mechanism, with return movement of the gripper assembly bringing the strap length into position at the sealing station. The gripper assembly includes means which insure that the strap will be positively captured and retained during transportation of the strap length to the sealing station. Sensing means is preferably provided at the strap cutting station for sensing the absence of a strap when the strap is removed from a storage area, with the sensing means actuating a complete strapping cycle which includes a strap feeding means to provide a further length of strap at the strap storage means to accommodate the next bale or bundle.

DESCRIPTION OF THE DRAWINGS

FIG. 1 is a plan view diagrammatically illustrating the apparatus of the present invention;

FIG. 2 is an enlarged plan view illustrating a portion of the gripper assembly, a portion of the needle assembly, and the cutter assembly;

FIG. 3 is a front elevational view taken generally as illustrated along line 3-3 of FIG. 2;

FIG. 4 is a sectional view taken generally along line 4-4 of FIG. 2;

FIG. 5 is an enlarged plan view of the sealer head and fork assembly, with certain parts broken away for clarity of illustration;

FIG. 6 is an elevational view of the structure illustrated in FIG. 5 taken generally along line 6-6 of FIG. 5;

FIG. 7 is a fragmentary plan view illustrating primarily a strap confining and guiding structure; and FIG. 8 is a sectional view taken generally along line 8-8 of FIG. 7.

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

In the following detailed description, the ligatures for encircling and binding the object at the strapping station are primarily referred to as strapping, although it will be apparent from the ensuing description that the principles of the present invention apply equally to various types of ligatures, such as metallic and nonmetallic straps, wire, string, etc. Also, the various structures of the present invention may be used in binding diverse types of bundles and packages, in addition to bales. Additionally, while only a single gripper assembly, sealing assembly and needle assembly are hereinafter described in detail, in most instances, plural assemblies are provided to seal plural ligatures around an object, and in such instances, the sets of assemblies are commonly driven. Furthermore, while hydraulic cylinders are hereafter described as the means for moving the gripper assembly, the sealing assembly, and the needle assembly, any suitable means may be used for moving these assemblies in the manner hereafter described, and the present invention is not intended to be limited to the use of hydraulic cylinders.

GENERAL ORGANIZATION

Referring first to FIG. 1, the apparatus of the present invention includes a gripper assembly 10 that is actuated by a first hydraulic cylinder 11, a sealer assembly 12 that is actuated by a second hydraulic cylinder 13, a needle assembly 14 that is operated by a third hydraulic cylinder 15, a strap dispensing and feeding assembly 18, and a strap cutting assembly 19. The assemblies 10, 12, 14, 18 and 19 are illustrated diagrammatically in FIG. 1, it being understood that the assemblies are integrated into a cooperative and unitarily coacting assembly, supported on a frame indicated generally at F. As is well known, in a typical bale compress, a bale B2 is compacted at a station I between upright walls on bale liners 16, and the bale is movable from right to left, as viewed in FIG. 1, by a horizontal ram to a strapping station II where encircling ligatures are applied. In other environments, packages, such as B1 and B2 in FIG. 1, may be moved from right to left by a suitable conventional conveyor, not shown, and which is intermittently driven by a suitable mechanism in timed relation with respect to assemblies 10, 12 and 14. In essence, the present invention contemplates the provision of bale or package moving means, of any suitable type, which interacts with the timed sequence of operations of the various assemblies hereinafter described in detail.

Bale B1 is shown disposed in the strapping station II in position for the strap sealing operation, and when a loop is completed and sealed therearound, hydraulic cylinder 15 is actuated to move the needle assembly 14 rearwardly beyond bales B1 and B2. The bale B2 is then moved to the left, and a length of strap 17, extending between dispensing assembly 18 and a storage chute C associated with cutter assembly 19, is clamped between bales B1 and B2. As bale B2 continues to move to the left, strap is drawn from the strap dispenser assembly 18 and from the strap storage chute, it being understood that suitable means are provided for accurately controlling the length of strap that has been previously fed into the storage means. Suitable controlling means to be hereafter described is preferably provided for terminating the operation of the bale moving means. With the bale situated at the strapping station II, a length of strap 20 is in front of a fork 21, with the strap extending around the left-hand side of the bale, the rear of the bale and to the strap dispensing assembly 18. Hydraulic cylinder 15 is then actuated to move ram 22 outwardly, and guide means associated with the needle assembly 14 bears against the strap to pull the strap from the dispenser assembly 18, so that a length of strap 24 is disposed adjacent the right-hand side of the bale at the sealing station, with a length of strap 25 (FIG. 2) being spaced therefrom. The strap feeding means is preferably arranged to induce a curvature in the strap, so that the fork 21 may easily enter between the bale B2 and the strap.

Hydraulic cylinder 11 is then actuated to move gripper assembly 10 from left to right as viewed in FIG. 1 to shift the fork upwardly under the strap, to lift the strap away from the bale into a proper position to have a seal applied, and to move a blocking pin 23 in front of sealer assembly 12 to prevent premature actuation of the sealer assembly. Continued movement of the gripper assembly 10 to the right past the position of FIG. 2 enables the gripper assembly to positively capture the left-hand length of strap 24 and to sever the right-hand length of strap 25, leaving a free strap end 26. Continued movement of gripper assembly 10 to the right brings the end of strap length 25 into alinement with a slot 28 in the cutting mechanism 19, and the dispenser assembly 18 is then actuated to feed a predetermined length of strap, as dictated by the next size of the bale or package to be strapped, along slot 28 to the storage chute C.

Cylinder 11 is then reversed to move gripper assembly from right to left, and the strap length 24 captured by the gripper assembly is pulled around the front of the bale at the strapping station II, in front of fork 21, and into overlapping relationship with respect to strap length 20. The return movement of the gripper assembly 10 retracts blocking pin 23 from in front of sealer assembly 12, and the hydraulic cylinder 13 is then actuated to advance the sealer assembly 12 into seal impressing relationship with respect to the overlapped strap portions.

DETAILED DESCRIPTION

The gripper assembly 10 is best seen in FIGS. 2 and 4, and includes a pair of juxtaposed gripper fingers 30 that are pivotally mounted at 31 upon a gripper block 34. Fingers 30 are resiliently urged toward one another by a compression spring 32 which is seated within the rearward end of each finger 30 spaced from pivot 31. The gripper assembly 10 includes a cam roller 33 for actuating the fork lift mechanism, as will be hereinafter described, and cam roller 33 is also mounted upon pivot 31 inwardly of a lateral flange 34a on gripper block 34. The gripper block 34 has an inclined, rearwardly facing camming surface 35 for retracting the sealer blocking pin 23, as will hereinafter appear.

The gripper fingers 30 include means for positively capturing and retaining a length of strap, and further means for guiding the strap into the capturing and retaining means. To this end, the forwardmost facing surfaces 30a of fingers 30 are inclined, and diverge outwardly to provide a strap confining guideway. Alined, rearwardly facing shoulders 30b are spaced from one another by a distance less than the width of the strap to provide a strap confining means. Shoulders 30b are both offset from pivot axis 31, so that when a strap captured by the gripping fingers bears against shoulders 30b, as for example during return movement of the gripper assembly, the fingers 30 are urged toward one another with an increasing strap retaining force, thereby insuring that the strap will not pull out of the gripper assembly.

The fork structure will be best seen in FIGS. 5 and 6, and as illustrated therein, the fork 21 is carried by a fork arm 36 that is mounted for pivotal movement relative to the sealing assembly 12 by a pin 37. A compression spring 38 surrounds pin 37 and urges the lower portion of fork arm 36 against an outwardly facing surface on mounting block 39 for frictionally retaining the fork arm 36 in place. A lock nut 40 bears against the outer end of spring 38 to compress the spring 38 and to urge fork arm 36 against block 39 with a preselected amount of force. Alternatively, detent means (not shown) may be provided for more positively retaining the fork arm in place. The fork arm 36 is generally U-shaped in side view, as can be seen in FIG. 6, with the fork 21 being secured to the longer leg 36a of the fork arm, and with a cam surface 41 being provided at the upper end of the short arm 36b of the fork arm. Cam surface 41 is positioned in the plane of roller 33, so that as the gripper assembly 10 moves from the position of FIG. 1, the roller 33 will engage cam surface 41 to pivot the fork arm 36 in a clockwise direction as viewed in FIG. 6. FIG. 6 illustrates the fork arm 36 in full lines in an intermediate position, where it has been partially moved by the roller 33, with the initial clearance position and the final active position being shown in broken lines at opposite sides of the intermediate position.

As can be seen in FIG. 6, the bale liner 16 includes a guide slot 16a to insure the proper positioning of the strap around the bale. Fork 21 includes a pair of spaced, tapered fingers 21a and 21b for holding the overlapping strap portions in a position to be sealed, and fingers 21a and 21b are spaced by a distance sufficient to allow a seal impressing mechanism, such as that disclosed in Ericsson et al. U.S. Pat. No. 3,198,218, to crimp a seal around the overlapping strap portions. The bale liner 16 is provided with an arcuate recess 16b adjacent guide slot 16 to accommodate the arcuate swinging movement of fingers 20a and 20b.

The blocking pin 23 is connected to a lever 43 by a pin 44, and the lower end of lever 43 is mounted at 45 for pivotal movement relative to the sealer assembly 12. A torsion spring 46 surrounds pivot 45 and bears against the lower end of lever 43 to bias the lever 43 in a clockwise direction as viewed in FIG. 5. A roller 47 is provided at the upper end of lever 43 and engages the gripper block 34 when the gripper assembly is in the position of FIG. 1. When the gripper assembly moves to the right out of engagement with roller 47, spring 46 pivots the lever 43 so that the pin 23 moves in front of the sealer assembly 12 to prevent the sealer assembly from moving toward the fork structure. During return movement of the gripper assembly 10 from right to left to the position of FIG. 1, the cam surface 35 on the gripper block 34 engages the roller 47 to pivot the lever 43 and retract the pin 23 to allow the sealer assembly 12 to be moved toward the overlapped strap portions.

The needle assembly 12 will be best understood from FIGS. 2—4 and as illustrated therein, the needle assembly includes a pair of spaced plates 50 and 51 secured to one another and to the ram 22 of cylinder 15. A strap guide wheel 52 is mounted between plates 50 and 51, and is movable into engagement with the strap extending outwardly from dispenser 18 when the needle assembly 14 is moved downwardly by cylinder 15, after a bale has been moved into the strapping station. A guide rod 57 cooperates to retain the needle assembly in alinement during its travel, and guide rollers 53—56 (FIGS. 2 and 3) are mounted against the cutter station and bear against plates 50 and 51 to properly locate the needle assembly adjacent the cutter assembly 19 at the end of travel of the needle assembly.

An anvil 58 is mounted between needle assembly plates 50 and 51 for sliding movement relative thereto by having a pin 58a received in a slot 58b, and anvil 58 includes a narrowed end 58c (FIG. 4) that is enterable between the gripping fingers 30 and 31 as the gripper assembly 10 moves to the right from the positions of FIGS. 2 and 4. The needle assembly plates 50 and 51 are cut out to allow the gripper assembly to move to the right relative thereto, as can be best seen in FIG. 2, and the gripper block 34 includes an upright abutment surface 59 rearwardly of shoulders 30b that is movable into engagement with the end of narrowed portion 58c of the anvil 58.

The cutter assembly 19 includes a cutter arm 60 pivotally mounted at 61 and having a roller 62 at one end thereof that is engaged by wheel 52 as the needle assembly 14 is moved downwardly to the position of FIG. 2. Cutter arm 60 is normally biased toward engagement with an upright stop pin 64 by a spring 63, and when the needle assembly 12 moves to the position of FIG. 2, wheel 52 pivots arm 60 in a counterclockwise direction against the bias of spring 63. A cutter blade 66 is carried by a cutter block 67 that is pivotally mounted at 68, and a spring 69 bears against the end of cutter block 67 to normally urge the cutter blade 66 to a clearance position above the needle assembly plate 50. The cutter blade 66 includes an elongated slot 70 (FIG. 4) allowing it to move rearwardly with respect to block 67 against the bias of a spring 71. Cutter blade 66 includes a downwardly extending cutting portion 72 (FIG. 4), so that when the anvil 58 is moved to the right by the gripper assembly 10, the right-hand end of the anvil will move into engagement with the cutting portion 72 of the blade 66 to move the blade 66 to the right. This latter movement will cause the cutting portion 72 to sever the strap portion 25, and further movement of the gripper assembly 10 to the right will bring the free end of strap portion 25 into alinement with the slot 28 in the cutting mechanism 19. The strap dispensing means 18 is then actuated to feed a preselected quantity of strap through the slot 28 along a chute C to a storage means (not shown).

A limit switch L.S. is associated with the cutter assembly 19, and the limit switch has a switch actuator disposed within slot 28, so as to sense the presence or absence of a length of strap therein. The limit switch is connected in a suitable circuit (not shown) such that when the strap has been withdrawn from the storage means through slot 28 by movement of a bale into the strapping station II, the limit switch is actuated to energize means for initiating a sealing cycle, including means for operating hydraulic cylinder 15 to effect movement of the needle assembly 14 toward the cutter assembly 19. Any suitable means, not shown, is associated with the strap dispensing assembly 18 for feeding a predetermined length of strapping material through the slot 28 to the storage means, with the length of strap being dependent upon the size of article to be strapped.

After the strap has been severed and fed out to the storage means, cylinder 11 is actuated to reverse the movement of the gripper assembly and the strap portion 24 captured between the gripping fingers 30 is pulled to the left as viewed in FIG. 2. The end of strap portion 26 is pinched between wheel 52 and roller 62, so that the strap is drawn tightly around the package at the sealing station. Continued movement of the gripper assembly to the left carries the strap portion 24 around the flipper latch 75 to be hereafter described which confines the loose strap end in the strap guide, and further movement of the gripper assembly pulls the end of strap portion 26 from between wheel 52 and roller 62.

As the gripper assembly 10 continues to move to the left, cam surface 35 on the gripper block 34 moves into engagement with roller 47 to pivot the lever 43 and withdraw pin 23 from blocking engagement with the sealing mechanism 12. The hydraulic cylinder 13 is then actuated to shift the sealing mechanism 12 toward the overlapping strap portions at the sealing station. The sealer assembly 12, is preferably essentially the same as that disclosed in Ericsson et al. U.S. Pat. No. 3,198,218. As is discussed in detail therein, the sealing mechanism includes a seal storage magazine and inserts the same between sealing and crimping jaws illustrated generally at 79. As the sealer assembly 12 moves rearwardly from the position of FIGS. 1 and 5 toward the sealing station II, a ram release pin 80 moves into engagement with a stop plate 81, and the ram release pin 80 is pivoted to condition the sealer actuating ram for movement in a direction to actuate the jaw structure 79. The sealer actuating ram is actually released for movement by a second ram release pin 80a, as is described in detail in the above-mentioned Ericsson et al. patent.

A fork reset latch 82 is mounted at 83 for pivotal movement relative to the sealer assembly 12 against the bias of a torsion spring 84, and the lower end of fork arm 36 includes a cam profile 86 that is engaged by the latch 82 as the sealer assembly 12 moves away from the sealing station. The latch 83 is free to move in a counterclockwise direction, as viewed in FIG. 6, but is blocked against movement in a clockwise direction. Thus, when the sealer assembly 12 is retracted after the sealing of the overlapped strap portions has been accomplished, reset latch 82 moves into engagement with the cam profile 86 to pivot the fork arm 36 in a counterclockwise direction as viewed in FIG. 6. This latter movement moves the fork 21 to a clearance position for receiving the strap length 20 when a subsequent package is moved into the sealing station. The cylinder 15 is then actuated to withdraw the needle assembly 14, and a further strapping operation can take place.

When the strap is fed into the storage chute C, a curvature is induced in the strap to enhance its ability to circumscribe an article at the strapping station II. Clamping means 90 (FIG. 1) is preferably provided at the strapping station II for holding a portion of the strap length 20 flat against the article at the strapping station. The clamping means 90 includes a mounting plate 91 that may be supported upon frame F, and a link 92 that is pivotally connected at one end to mounting plate 91 and at its opposite end to a strap holding member 93. Springs 94 are connected between the strap engaging member 93 and the mounting plate 91 and bias the strap holding member 93 against the strap when a package is moved into the sealing station.

The flipper latch structure 75 will be best understood from FIG. 7 and 8. As is illustrated therein, a pair of generally identically shaped mounting plates 95 are positioned in spaced, opposed relationship with respect to one another, with plates 95 including outwardly flaring upper ends 96 adjacent the guide slot 16a in the liner 16. Plates 95 include coplanar, perpendicular midportions 97, and a sleeve 98 is fixed to the midportion 97 of the left-hand plate 95. A pivot pin 99 extends upwardly from sleeve 98 and a latch member 100 is pivotally mounted upon pin 99. The left-hand plate 95 includes an elongate slot 101, and latch 100 extends outwardly through notch 101 toward the right-hand plate. A torsion spring 102 surrounds pivot pin 99, and one end 103 of the torsion spring bears against the left-hand plate 95, while the opposite end 104 of the torsion spring bears against latch member 100 to urge the same toward the right-hand plate 95. Lock nuts 105 are threaded upon the upper end of pin 95 to retain the torsion spring 102 thereon.

When the bale is shifted into the strapping position station II, the strap length 20 is disposed above the latch 100. When the gripper assembly 10 pulls the strap length 24 to the left into overlapping relationship with strap length 20, strap length 24 is disposed beneath latch 100. After the seal has been impressed upon the overlapping strap portions, and the strap bale is removed from the strapping station II, the latch member 100 is free to pivot against the bias of torsion spring 102 to allow the completed bale to move out of the strapping station.

I claim:

1. Strapping apparatus comprising: means defining a strapping station; structure for providing a length of binding material about an object at the strapping station and for providing overlapping portions of binding material at a sealing station; positioning means mounted for movement between a clearance position and an active position between said object and said overlapping portions to move said overlapping portions into a sealing position; structure for securing said overlapping portions to one another; and means responsive to actuation of one of said structures for moving said positioning means from the clearance position to the active position.

2. Strapping apparatus as set forth in claim 1 including support structure, said positioning means being defined by a fork member mounted for pivotal movement relative to said support structure.

3. Strapping apparatus as set forth in claim 2 wherein said fork member includes spaced strap engaging fingers defining a strap securing zone therebetween.

4. Strapping apparatus as set forth in claim 2 wherein spring means is biased between said support structure and said fork member for retaining said fork member in the clearance and active positions.

5. Strapping apparatus as set forth in claim 1 wherein said positioning means is moved from the clearance to the active position in response to actuation of said material providing structure.

6. Strapping apparatus as set forth in claim 5 wherein said material providing structure includes means for gripping a length of binding material, said gripping means being movable between a rest position and a material pickup position, said positioning means being moved from the clearance position to the active position in response to movement of the gripping means from the rest position toward the material pickup position.

7. Strapping apparatus as set forth in claim 6 in which said positioning means includes a cam surface in the path of said gripper means, and wherein said gripper means includes an abutment engageable with said cam surface for moving said positioning means from the clearance position to the active position.

8. Strapping apparatus as set forth in claim 7 in which said securing structure includes a sealing head movable toward and away from said sealing station, and wherein said sealing head includes means, movable therewith, for moving said positioning means from the active position to the clearance position in response to movement of said sealing head away from the sealing station.

9. Strapping apparatus as set forth in claim 6 including blocking means responsive to movement of said gripper means from the rest position toward the material pickup position for preventing actuation of said securing structure.

10. Strapping apparatus as set forth in claim 9 in which said securing structure includes a sealing head movable toward and away from said sealing station, and wherein said blocking means includes an abutment movable in front of said sealing head for preventing movement of said sealing head toward said sealing station after said gripper means has moved out of said rest position.

11. Sealing structure as set forth in claim 10 in which said abutment is carried upon a pivotally mounted member, and wherein resilient means acts upon said member for urging said abutment toward a position in front of said sealing head, said gripping means including means movable into engagement with said abutment when said gripping means from said material pickup position to said rest position for pivoting said member and said abutment to an out of the way position freeing said sealing head for movement toward said sealing position.

12. Strapping apparatus as set forth in claim 11 in which said positioning means includes a pivotally mounted member having a cam profile thereon, and wherein said sealing head includes means, engageable with said cam profile in response to movement of said sealing head away from said sealing station, for moving the positioning means from the active position to the clearance position.

13. Strapping apparatus as set forth in claim 1 including means at said sealing station for guiding said binding material.

14. Strapping apparatus as set forth in claim 13 in which at least one object support plate is provided at said sealing station, said support plate having a slot therein for guiding said binding material.

15. Strapping apparatus as set forth in claim 14 wherein further guiding structure is provided outwardly of said slot in alinement therewith.

16. Strapping apparatus as set forth in claim 15 in which said further guiding structure includes first and second guide plates, each alined with one edge of said slot, and wherein a latch member is pivotally mounted on one of said guide plates, with spring means urging the latch member toward the other guide plate, said latch member pivoting against the bias of said spring means to allow a sealed object to move out of the strapping station.

17. A gripper assembly for use in strapping apparatus comprising: a base having an abutment surface thereon; first and second juxtaposed strap gripping fingers pivotally mounted on said base, said fingers each having a strap retaining shoulder thereon spaced from and facing said abutment surface to define a strap holding chamber therebetween, said shoulders being spaced from one another by a distance less than the width of the strap so as to capture and retain the strap within said chamber; and means urging said fingers toward one another.

18. A gripper assembly as set forth in claim 17 wherein the shoulder on each finger is offset from its pivot axis, whereby the force of the strap against the shoulders moves the fingers toward one another.

19. A gripper assembly as set forth in claim 17 wherein each finger includes an inclined strap guiding surface adjacent the outer end thereof, said guiding surfaces facing one another to define a coverging strap guideway.

20. Strapping apparatus comprising: means for providing a U-shaped length of strap at a cutting station; means at said cutting station for severing one side of said U-shaped length; gripping means movable toward and away from said cutting station, said gripping means having means for capturing and retaining the other side of said U-shaped length; and means responsive to movement of said gripping means toward said cutting station for actuating said severing means.

21. Strapping apparatus as set forth in claim 20 in which the strap providing means is mounted for movement between a position at said cutting station and a clearance position spaced therefrom; and wherein said severing means includes a movable knife element movable into strap severing position in response to arrival of said strap providing means at said cutting station.

22. Strapping apparatus as set forth in claim 21 in which said knife element is pivotally mounted at said cutting station, with means biasing said knife element away from said strap severing position; and wherein said strap providing means includes structure for pivoting said knife element against said biasing means into said strap severing position.

23. Strapping apparatus as set forth in claim 22 in which an actuating lever is mounted for pivotal movement at said cutting station, said actuating lever being movable in a first direction to engage said knife element and pivot the latter into strap severing position against the bias of resilient means which urge the actuating lever in a second direction away from said knife element; and wherein said strap providing means includes an abutment engageable with said actuating lever in response to arrival of said strap providing means at said cutting station for pivoting said actuating lever in said one direction.

24. Strapping apparatus as set forth in claim 23 in which means at said cutting station mount said knife element for longitudinal, as well as pivotal movement; and wherein said knife is moved longitudinally through a strap severing stroke in response to movement of said gripping means toward said cutting station.

25. Strapping apparatus as set forth in claim 24 wherein strap storage means is provided adjacent said cutting station for receiving a length of strap beginning with the severed end of said one side of said U-shaped length.

26. Strapping apparatus as set forth in claim 20 including strap holding means at said cutting station and on said strap providing structure, the strap holding means on said strap providing structure being movable into strap compressing relationship with the strap holding means at the cutting station to retain the severed strap therebetween and apply a controlled resistance to movement of said gripping means away from said cutting station.